Sept. 9, 1952          W. M. HALL          2,610,320

SYSTEM OF RADIO ECHO DETECTION

Filed Dec. 18, 1942          2 SHEETS—SHEET 1

INVENTOR
WILLIAM M. HALL
BY
ATTORNEY

Sept. 9, 1952 W. M. HALL 2,610,320
SYSTEM OF RADIO ECHO DETECTION
Filed Dec. 18, 1942 2 SHEETS—SHEET 2

INVENTOR
WILLIAM M. HALL
BY
ATTORNEY

Patented Sept. 9, 1952

2,610,320

UNITED STATES PATENT OFFICE 2,610,320

SYSTEM OF RADIO ECHO DETECTION

William M. Hall, Lexington, Mass., assignor to the United States of America as represented by the Secretary of the Navy Application December 18, 1942, Serial No. 469,474

15 Claims. (Cl. 343—11)

This invention relates to a system of radio echo detection and particularly to such a system in which the location of an object in two planes and also its range may be determined automatically.

Radio echo detection systems have been used in which electromagnetic waves have been radiated into space in discrete pulses, there being no radiation between the pulses. When such radiation is intercepted by an object in space it is reflected back towards the point of origin and may be received there. The direction of the radiation when the reflected signal is received is then noted and the time required for the pulse to leave the transmitter and be reflected back from the object is measured, and in this manner the direction of the object from the transmitter, as well as the distance therefrom, is determined.

It is one of the objects of the present invention to provide a system of radio echo detection in which information corresponding to three coordinates may be indicated on a device where two coordinates are normally indicated.

Another object of the invention is to provide an indicating apparatus for a radio echo detection system in which the signal-to-noise ratio is greatly improved over those heretofore used.

Another object of the invention is to provide a system of radio echo detection in which the azimuth, elevation, and range of an object in space may be simultaneously represented on a single device.

Another object of the invention is to provide a system of radio echo detection in which two or more objects in the same general direction may be simultaneously observed.

Still another object of the invention is to provide a means and a method of simultaneously indicating the azimuth, elevation, and range of several objects in space on a single indicating device.

Other objects of the invention and objects relating to the arrangement and electrical connection of the various parts will be apparent as the description of the invention proceeds.

The invention has been illustrated in the accompanying drawings in which.

Figure 1:
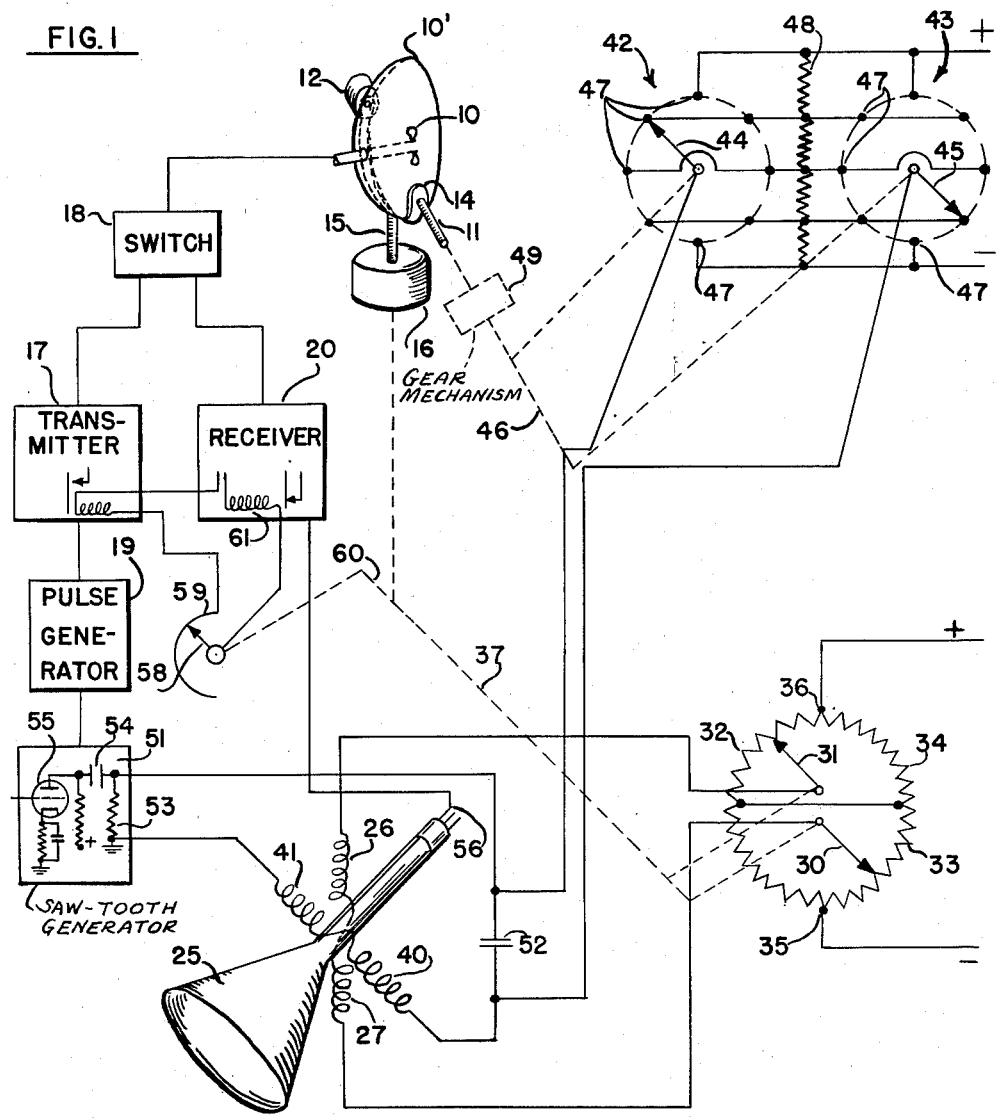
Fig. 1 is a diagrammatical representation of one form of the system of the invention showing the interconnection of the various parts.

Referring now to Fig. 1, an antenna 10, provided with a suitable reflecting system 10', is arranged to radiate a relatively narrow beam of electromagnetic waves and is mounted on a horizontal axis 11 for oscillation in a vertical plane, this oscillation being controlled by the mechanism 12 which is operatively connected to the shaft 11. The shaft 11 is shown mounted in a U-shaped bracket 14 which is in turn mounted on the vertical shaft 15, so that it may rotate in a horizontal plane as the shaft 15 is rotated. The shaft 15 is rotated by means of the mechanism 16 in which it is mounted. It will be seen that the antenna 10 is thus moved in a horizontal plane by rotation of the shaft 15 and at the same time in a vertical plane by oscillation of the shaft 11. Suitable electrical connections to the antenna are provided to permit this movement about two axes.

Various different scanning sequences may be produced by this arrangement of mounting the antenna, but I prefer to have it turn through 360° in the horizontal plane and to have it oscillate in a vertical plane through an angle of about 60°.

The antenna 10 is provided with a transmitter 17 which is connected to it through a suitable switching device 18. A carrier wave of any suitable length, as for instance, one normally measured in centimeters, may be used for radiation into space. I then modulate this wave with a series of pulses recurring at a uniform and rapid rate, each being a small fraction of a second in time duration. The duration of the pulse and the rate of recurrence is subject to some variation depending on the desired range for the system. The transmitter is modulated with these pulses by means of the pulse generator 19, the arrangement being such that the antenna radiates only during one of these pulses and there is no radiation at all during the time interval between pulses.

A receiver 20 is also connected to the antenna 10 through the switch 18. This switch may be of the discharge type and is arranged so as automatically to disconnect the receiver from the antenna and to connect the transmitter to the antenna during the radiation of a pulse and to disconnect the transmitter and connect the receiver to the antenna in the time interval between pulses. In this manner the receiver does not receive the strong radiation from the transmitter and thus blocking of or damage to the receiver is avoided.

Figures 3, 4:
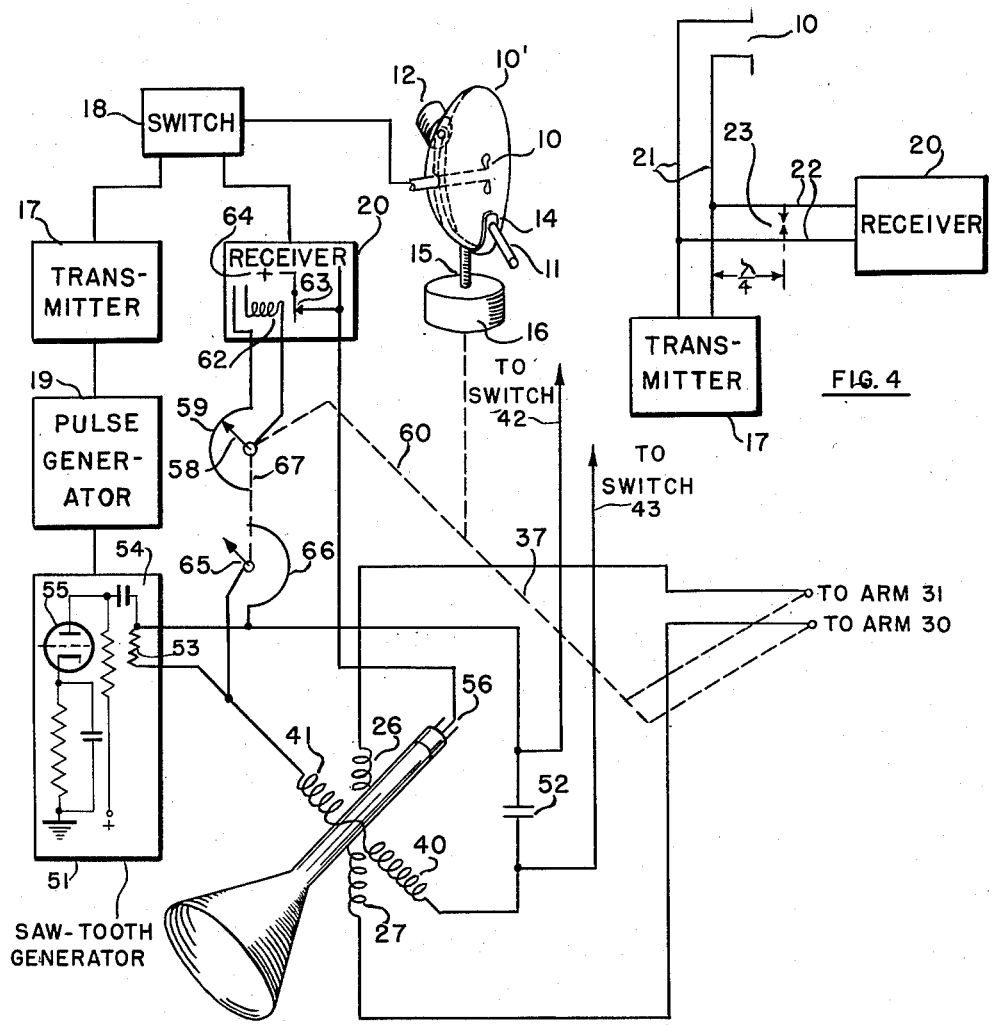
Fig. 3 is a diagrammatical representation similar to that of Fig. 1 but showing a modified form which produces a somewhat different result.
Fig. 4 is a diagrammatical representation of one form of automatic switch which may be used with the invention.

One form of such a switch has been illustrated in Fig. 4. Here the antenna 10 is shown connected to the transmitter 17 by means of two spaced parallel wires 21. The receiver 20 is connected by means of spaced parallel wires 22 to the wires 21, and the wires 22 are provided with a spark gap 23 at a distance from the wires 21 equal to one-quarter of the wave length, λ, measured on the transmission line, of the particular carrier wave for which the system is designed. This distance is indicated on the drawing as $$\frac{\lambda'}{4}$$

The transmitter 17 is arranged so that it presents low impedance to the line 21 when it is operating which impedance will be the characteristic impedance of the line, but when it is not operating the impedance is high. When the transmitter is operating, the voltage across the spark gap 23 causes a discharge to take place which has the effect of shorting the receiver 20, but there is no shorting effect with respect to the transmitter because of the standing waves in the quarter wave length section between the wires 21 and the spark gap 23. Hence the energy from the transmitter passes to the antenna 10 and substantially little reaches the receiver 20. On the other hand when the transmitter is off and the antenna 10 receives a signal, the impedance looking into the transmitter is high, while the impedance looking into the receiver is low and the energy passes from the antenna 10 to the receiver 20. The arrangement works automatically, the receiver being short-circuited when the transmitter is operating and being connected to the antenna when the transmitter is off.

In the complete system of Fig. 1, a cathode ray tube 25 is provided for correlating the information obtained by means of the reflected radiation. This tube may be of any desired type, but I have shown one for purposes of illustration in which the electron beam is controlled by means of magnetic deflection. For this purpose, a pair of deflecting coils 26 and 27 are positioned about the neck of the tube 25 so as to produce a vertical magnetic field and thus cause a horizontal sweep of the cathode ray beam when the field is varied. The outer ends of these coils are connected to the arms 30 and 31 of a potentiometer 32. This potentiometer has two semicircular windings 33 and 34 which are connected together at their ends and are arranged so that the arms 30 and 31, which are diametrically opposite, can contact first with the coil 33 and then with the coil 34. The mid-points 35 and 36 of the coils 33 and 34 respectively are connected across a suitable source of potential, not shown, but indicated by the plus and minus signs.

The two arms 30 and 31 of the potentiometer are mechanically connected, as indicated by the dotted line 37, to the mechanism for rotating the antenna 10 about a vertical axis. Thus, when the antenna 10 is rotated to scan a field in space about the vertical axis, the arms 30 and 31 of the potentiometer are correspondingly rotated which changes the current flowing in the deflecting coils 26 and 27 from a maximum in one direction down to zero and then to a maximum in the other direction. It will be understood that by means of this varying magnetic field the electron beam may be made to sweep horizontally across the tube from one side to the other and back again as the antenna 10 makes a complete 360° rotation.

A pair of vertical deflecting coils 40 and 41 are also provided for the cathode ray tube and are arranged about the neck of the tube so as to produce a horizontal magnetic field which will cause vertical deflection of the electron beam when the current in the coils is varied.

In order to produce a current in the coils 40 and 41 which will vary with the vertical inclination of the antenna 10, a pair of step switches 42 and 43 are provided which have contact arms 44 and 45, respectively, mounted on the same shaft and mechanically connected to the antenna shaft 11, as indicated by the dotted line 46. Each of the arms 44 and 45 is associated with a plurality of contacts 47, spaced symmetrically around the sweep of the arms, the arrangement being such that each arm is always making an electrical connection with one of said contacts, and as an arm moves out of electrical connection with one contact it moves into electrical connection with another.

Two of the contacts 47 on each switch which are diametrically opposite each other are connected to the opposite ends of a resistance 48 across which is also connected a suitable source of potential, not shown, but indicated by the plus and minus signs. The intermediate contacts are connected to intermediate points on the resistance 48, as indicated, so that as the contact arms 44 and 45 rotate, maintaining their diametrically opposite position with respect to each other, the voltage applied across the coils 40 and 41 will vary in a series of steps and the current flowing will vary in a series of steps, from maximum in one direction down to zero and then to maximum in the other direction. This will cause the electron beam in the cathode ray tube to move vertically in a series of steps depending on the number of contacts on the switches.

As already mentioned, the antenna preferably scans vertically through an angle of about 60°, and I therefore provide a mechanical change gear mechanism 49 by means of which the contact arms 44 and 45 may be geared to rotate through 180° in one direction during the vertical movement of the scanner in one direction and then back again through 180° as the scanner moves in the reverse direction through its limited angle of oscillation.

Figure 2:
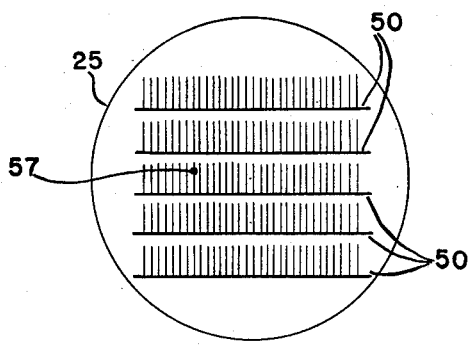
Fig. 2 is a front view of the cathode ray tube used in the system of Fig. 1 as an indicating device and showing the manner of representing the information received by the system.

I prefer to rotate the antenna 10 about the vertical axis at a much faster rate than the oscillation in a vertical plane, so that the electron beam in the cathode ray tube will trace a plurality of spaced horizontal lines 50 across the face of the tube, five being shown in Fig. 2, although it will be understood that any number may be used, depending on the concentration of the beam; the number of contacts on the switch arms 44 and 45 being chosen accordingly, so as to give the desired spacing of the horizontal lines 50 on the face of the tube.

The vertical position of the electron beam, as described above, is controlled by the vertical angle of the antenna 10. However, an additional vertical deflection current is provided to cause the beam of electrons to sweep vertically as each pulse is radiated. For this purpose a saw-tooth wave generator 51 is connected to the pulse generator in such a manner that the saw-tooth wave produced by the generator 51 will start to rise when a pulse is radiated and will continue to rise during the time interval between that pulse and the next pulse or during a portion of such interval. The steep side of the saw-tooth wave causes the return trace of the beam.

The magnitude of the current produced by the saw-tooth wave generator 51 will be such that the electron beam will never move vertically beyond the horizontal line of scanning which is immediately above it. The superposed vertical scan, therefore, will fill in the space between two of the lines 50 but will not cross the lines.

In order to apply this voltage to the coils 40 and 41, as well as the stepped voltage picked up by the switch arms 44 and 45, I provide a condenser 52 which is connected between the two switch arms 44 and 45. One side of this condenser is then connected to one end of the coil 40, and the other side of the condenser is connected to one end of a resistor 53 in the saw-tooth wave generator 51, which resistor is coupled by means of the condenser 54 to the output circuit of the output tube 55. The other end of the resistor 53 is connected to the outer end of the coil 41.

The output of the receiver 20 is connected to the control grid 56 of the cathode ray tube 25, so that when a reflected pulse is received by the receiver, the control grid of the cathode ray tube may be swung in a positive direction to increase the intensity of the electron beam at that instant.

In the operation of the system, the antenna 10 radiates a succession of pulses in a narrow beam of electromagnetic waves, and the antenna sweeps in a series of complete, 360° rotations about the vertical axis, while at the same time it is moving through a predetermined vertical angle. Also, it will be understood that the antenna is substantially disconnected from the transmitter during the time interval between pulses, and the receiver is connected to it. The horizontal direction of the electron beam in the cathode ray tube will always correspond to the horizontal directional component of the beam radiated from the antenna, and its position vertically, as far as the steps of the switch arms 44 and 45 are concerned, will correspond to the vertical direction of the beam radiated from the antenna. In addition, each time a pulse is radiated, the electron beam in the cathode ray tube will move vertically a distance corresponding to the distance between horizontal scanned lines.

If now a pulse, having been radiated by the antenna, is intercepted by an object in space and reflected back to the antenna before the next pulse is radiated, it will operate the receiver and cause the receiver to increase the intensity of the electron beam in the cathode ray tube. Thus, a bright spot on the face of the tube will be formed at the instant the reflected signal is received. The bright spot of light will therefore appear in one of the sections above one of the horizontal lines 50, indicated in Fig. 2, as for instance, at 57. The particular section in which this spot will appear will be determined by the angular position of the antenna 10 in a vertical plane when the reflected pulse was radiated which has caused the bright spot. The horizontal position of the bright spot across the face of the tube will depend upon the angular component in a horizontal plane of the beam at the same instant. The position of the spot 57 above the horizontal scanning line will depend on the time required for the radiated pulse to move out into space from the antenna 10 and be reflected back again by the particular object in space.

The object in space may thus be located both horizontally and vertically and its range from the antenna 10 will be indicated by the vertical position of the spot 57 in the particular scanned section. The space between horizontal scanned lines is necessarily limited and hence the distance on the face of the cathode ray tube for representing the range of the object is small and the range therefore cannot be accurately represented. Nevertheless, all three kinds of information are present on the single cathode ray tube; the azimuth angle, the elevational angle, and the range.

There is another important result which is accomplished by the additional vertical deflection. This is the improvement in the signal-to-noise ratio, thus permitting signals to be seen which ordinarily would be obliterated by the noise level. Since the antenna scans horizontally at a relatively slow speed, the cathode ray beam moves relatively slowly from side to side of the cathode ray tube. If there were no vertical deflection at the rate of the pulses being radiated, an interval of time corresponding to the time required for a signal to reach an object in space and be reflected back would be crowded into a small horizontal space on one of the horizontal lines of the tube. The result would be that all of the noise during this time interval would appear at this spot at exactly where the signal would appear. By means of the superposed vertical deflection, the noise during this time interval is spread out over the space between the horizontal scanned lines and is therefore weaker at any one spot. Thus the signal when it comes will be brighter than the noise and therefore will be easier to see. This is an important object of the invention and acts to increase the range of the apparatus.

Another advantage of the additional vertical deflection arises because of the fact that reflected signals always appear on the cathode ray tube in the spaces between the lines 50, while direct signals from the transmitter, affecting the receiver because of leakage through the switch 18, appear on the lines 50. Because of the fact that these signals do not interfere with each other, the switch 18 need not be perfect, some leakage through it even being desirable in some cases to help define the horizontal lines 50.

Two or more objects in the same general direction from the antenna but at different distances may be observed simultaneously on the screen of the cathode ray tube. An object nearer than the object represented by the spot 57 in Fig. 2 will produce another spot between the spot 57 and the next lower horizontal line; an object farther away will produce a spot between the spot 57 and the next higher horizontal line.

The system may be arranged to scan through 360° about the vertical axis, as has been stated above. However, in some cases it may be preferred to scan through 180° only, but to permit the scanner to continue to rotate through the complete circle. In such a case I provide a switch arm 58 which is rotatably mounted to sweep about a semicircular contact 59. The switch arm 58 is mechanically connected, as indicated by the dotted line 60, to the mechanism 16 producing the horizontal movement of the antenna 10. During half of the rotation the arm 58 is touching the contact 59; while during the other half the two are disconnected. The switch arm 58 and the contact 59 are connected to a suitable relay 61 in the receiver 20 which shuts off the receiver during half the time of rotation. Without the switch 58—59 the receiver would be operating at all times during the rotation of the antenna about the vertical axis and the electron beam of the cathode ray tube would sweep across the tube from one side to the other and then back again. With the switch 58—59 in circuit, only one sweep of the electron beam will be used, the return sweep being made while the receiver is inoperative.

A relay 61' may also be provided in the transmitter 17 connected to operate with the relay 60 and arranged to shut off the transmitter during the 180° of scan that the system is not in use. This cools the transmitter and also conserves power.

In some instances it may be desirable to produce a clearly defined horizontal line at the base of each of the scanned sections on the cathode ray tube so that the range may be more easily determined at a glance. In order to do this I may utilize the unused 180° sweep of the antenna for producing a horizontal line at the elevation determined by the switch arms 44 and 45 on the potentiometers 42 and 43. For this purpose I provide a slight modification of the arrangement which is shown in Fig. 3 and which includes all of the structure of Fig. 1 and differs therefrom only by the part of the circuit involving switches 58 and 65. I utilize the switch 58—59 to operate a relay 62 within the receiver 20 which will close contacts 63 when the switch arm 58 has moved away from the contact 59 to place a positive voltage from a source, indicated at 64, on the connection for the control grid 56 of the cathode ray tube 25. At the same time, switch arm 65 moves against a semicircular contact 66 to short-circuit the high-speed vertical sweep resistor 53, so that the only current flowing through the coils 40 and 41 is that under control of the switches 42 and 43. The switch arm 65 is mechanically connected to the arm 58, as indicated by the dotted line 67, so that both switch arms are controlled by the horizontal scanning mechanism.

In the operation of this modified form of the system, the antenna scans through a horizontal angle of 180°, during which time the pulses are being radiated, and reflected pulses, if any, are being received. During this time the switch arm 58 is against the contact 59 and the relay 62 is operated, thereby separating the contacts 63 and removing the extra positive potential from the control grid of the cathode ray tube. At the same time the switch 65—66 is open and the electron beam has the high-speed vertical sweep superposed upon the position of the beam, as determined by the switches 42 and 43.

After the scanner has moved through the 180° scanning angle and starts on the rear 180° sweep, the switch arm 58 is separated from the contact 59, and the relay 62 releases, thus closing the contacts and putting the positive potential on the control grid 56 of the cathode ray tube 25. This causes the electron beam to produce an intense spot of light on the face of the tube. At the same time, however, the switch arm 65 is in contact with the contact 66 and the only current flowing through the vertical deflection coils 40 and 41 is that determined by the switches 42 and 43. As the scanner rotates horizontally, therefore, a bright spot of light will sweep back across the face of the tube at the level determined by the switches 42 and 43 and therefore following one of the lines 50 indicated in Fig. 2. With this arrangement the azimuth, elevation and range are determined by the forward scan of the antenna, while the rearward scan, which is not used for azimuth or range, produces the bright elevation or base lines.

While I have shown a single antenna to be alternately connected to the transmitter and receiver, it will be evident that each may have its own antenna if desired. In that case, some kind of switching arrangement should be provided to render the receiver insensitive when the transmitter is radiating its pulse, so as to prevent blocking of the receiver; or the antenna should be positioned with respect to each other so that the receiving antenna is protected from direct radiation from the transmitting antenna.

It will be understood that the system may be designed for detecting objects within various ranges from the antenna. The pulses must be spaced far enough apart in time so that a pulse can radiate out into space within the predetermined range and come back again before the next pulse is produced. However, it should also be understood that the power of the transmitter and the sensitivity of the receiver should be adjusted so that signals reflected back from objects at greater distances than the predetermined range will not be strong enough to operate the receiver, as otherwise they would introduce an ambiguity into the representation disclosed on the face of the tube. If it is desired to increase the range, then the pulse rate may be lowered and the power of the transmitter and the sensitivity of the receiver, or both, increased to obtain a sufficiently strong signal by reflection from the increased distance.

If desired, a cathode ray tube with a long persistence screen may be used, especially where the scanning rate of the antenna is relatively slow, so that a spot of light produced on the screen by an echo signal will remain there until the scanning cycle has been completed or nearly completed.

It will be seen from the above description of the invention that I have provided a system of radio echo detection whereby azimuth, elevation, and range may be represented instantaneously on a single indicating device. The superposed vertical trace on the horizontal scan also increases the signal-to-noise ratio and therefore the range of the apparatus. The system may be used on ground stations for locating airplanes in the air above; it may be used on ships to locate airplanes above; and it may be used on airplanes to locate other airplanes and also ships on the water beneath.

Many modifications may be made without departing from the spirit of the invention and I therefore do not desire to limit the invention to what has been shown and described except as such limitations occur in the appended claims.

What I desire to claim and secure by Letters Patent is:

1. A system of radio echo detection comprising, in combination, means to scan a predetermined field in space about two axes with a concentrated beam of electromagnetic radiation, means to intercept radiation reflected back from an object within said field, a screen, means to produce a spot of light on said screen in any one of a plurality of elongated sections of said screen arranged one above the other, means to determine in which of said sections said spot of light will appear by the angle of said radiation beam about one of the axes of scanning, means to determine the position of said spot longitudinally of said section by the angle of said radiation beam about the other of said axes, and means to determine the transverse position of said spot of light in said section by the lapse of time required for said radiation to be reflected back from said object.

2. A system of radio echo detection comprising, in combination, means to produce a high-frequency electromagnetic radiation, means to modulate said radiation with a succession of spaced pulses, means to concentrate said radiation into a relatively narrow beam, means to cause said beam to scan a predetermined field about one axis, a screen, means to produce a spot of light on said screen, means to cause said spot of light to move across said screen in one direction as said radiated beam moves about said axis, the position of said spot of light in that direction corresponding to the angle of said radiated beam about said axis, means to cause said radiated beam to scan said field about another axis, means to cause said spot of light to move across said screen in another direction, the position of said spot of light in said other direction representing a predetermined range of angular directions of said radiated beam about said other axis, additional means to cause said spot of light to move in said other direction a predetermined distance at the termination of each of said radiated pulses, means to intercept radiation reflected back from an object within said field, and means to cause each pulse of said received radiation to increase the intensity of said light spot.

3. A system of radio echo detection comprising, in combination, means to produce a high-frequency electromagnetic radiation, means to modulate said radiation with a succession of spaced pulses, means to concentrate said radiation into a beam, means to cause said beam to scan a predetermined field about a first axis, means to cause said beam to scan said field about a second axis, said beam having angular widths in planes perpendicular to said first and second axes that are small fractions of the angular widths of said scanned field, means to intercept radiation reflected back from an object within said field, means to determine the lapse of time from the radiation of a pulse to its interception, as reflected from said object, means to determine the angle of said beam about said first axis when said reflected radiation is received, means to determine the angle of said beam about said second axis when said reflected radiation is received, and means to correlate the determination of said angles and said time lapse into a single graphic representation, substantially instantaneously observable.

4. A system of radio echo detection comprising, in combination, means to produce a high-frequency electromagnetic radiation, means to modulate said radiation with a succession of spaced pulses, means to concentrate said radiation into a relatively narrow beam, means to cause said beam to scan a predetermined field about one axis, a screen, means to produce a spot of light on said screen, means to cause said spot of light to move across said screen in one direction as said radiated beam moves about said axis, the position of said spot of light in that direction corresponding at all times to the angle of said radiated beam about said axis, means to cause said radiated beam to scan said field about another axis, means to cause said spot of light to move across said screen in another direction, the position of said spot of light in said other direction representing at all times a predetermined range of angular directions of said radiated beam about said other axis and the rate of movement of said beam about said other axis being so adjusted that the movement of said spot of light in said first direction forms a series of spaced lines, means to cause said spot of light to move in a direction other than said first direction at the termination of each of said radiated pulses, the distance said spot moves in such direction being less than the distance in that direction between traces of said spot in said first direction, means to intercept radiation reflected back from an object within said field, and means to cause each pulse of said received radiation to increase the intensity of said light spot.

5. A system of radio echo detection comprising, in combination, means to produce a high-frequency electromagnetic radiation, means to modulate said radiation with a succession of spaced pulses, means to concentrate said radiation into a relatively narrow beam, means to cause said beam to scan a predetermined field about a vertical axis, a screen, means to produce a spot of light on said screen, means to cause said spot of light to move across said screen in a horizontal direction as said radiated beam moves about said vertical axis, the position of said spot of light in the horizontal direction corresponding to the angle of said radiated beam about said vertical axis, means to cause said radiated beam to scan said field about a horizontal axis, means to cause said spot of light to move across said screen in a vertical direction, the position of said spot of light in said vertical direction representing a predetermined range of angular directions of said radiated beam about said horizontal axis, means to cause said spot of light to move independently in the vertical direction at the termination of each of said radiated pulses, the distance of said movement being less than the distance between horizontal traces of said spot, means to intercept radiation reflected back from an object within said field, and means to cause each pulse of said received radiation to increase the intensity of said light spot.

6. A system of radio echo detection comprising, in combination, means to produce a high-frequency electromagnetic radiation, means to modulate said radiation with a succession of spaced pulses, means to concentrate said radiation into a relatively narrow beam, means to cause said beam to scan a predetermined field about one axis, a cathode ray tube, means to cause the electron beam in said tube to sweep across the face of said tube in one direction as said radiated beam moves about said axis, the position of said electron beam in that direction corresponding at all times to the angle of said radiated beam about said axis, means to cause said radiated beam to scan said field about another axis, means to cause said electron beam to move across the face of said tube in another direction, the position of said electron beam in said other direction representing at all times a predetermined range of angular directions of said radiated beam about said other axis, additional means including a part of said last-mentioned means to cause said electron beam to move in a direction other than said first direction at the termination of every radiated pulse, the amplitude of said movement being such that said electron beam will not strike the same spot on said tube for successive movements of said beam in said first direction, means to intercept radiation reflected back from an object within said field, and means to cause each pulse of said received radiation to increase the intensity of said electron beam.

7. A system of radio echo detection comprising, in combination, means for directing high-frequency radiation in a substantially concentrated beam, means for modulating said radiation with a succession of spaced pulses, means to scan a predetermined field with said beam in two directions, means to receive back said radiation reflected from an object within said field of scanning, a cathode ray tube, means to scan the face of said tube with the electron beam thereof in a series of separate sections arranged side by side, means to determine the section which said electron beam will strike by the angular position of said radiated beam in one direction, means to determine the position of said electron beam lengthwise of said section by the angular direction of said radiation beam in said other direction, means to position said electron beam laterally of any given section in proportion to the time interval between radiated pulses, and means to cause said received radiation to increase the intensity of said electron beam, whereby the position of an object in said field and its range may be instantaneously observed.

8. A system of radio echo detection comprising, in combination, means to radiate high-frequency electromagnetic waves in a substantially concentrated beam, means to modulate said radiation with a succession of spaced pulses, means to scan a predetermined field in two directions, horizontally and vertically, with said beam, means to receive back radiation reflected from an object within said field, a cathode ray tube, means to cause the electron beam of said tube to scan the screen thereof in a plurality of separate long narrow juxtaposed sections, extending horizontally of said radiated beam, means to produce a bright spot of light on the face of said tube whenever a radiated pulse is received back by reflection from an object which intercepts said beam, means to determine the position of said bright spot of light in any one of said scanned sections by the vertical position of said radiated beam, means to determine the horizontal position of said bright spot of light in said section by the horizontal direction of said radiated beam, and means to determine the position of said bright spot of light laterally within said section by the time required for a radiated pulse to be received back by reflection from said object.

9. A system of radio echo detection comprising, in combination, means for radiating a narrow beam of electromagnetic waves, means for modulating said waves with a succession of spaced pulses, means to scan a predetermined field in two directions, horizontally and vertically, with said beam, means to receive back radiation reflected from an object within said field, a cathode ray tube, means to scan successively a plurality of long narrow sections extending horizontally across the face of said tube and arranged side by side one on top of the other, each of said sections being scanned in a plurality of transverse lines, (there being one line for every radiated pulse), means to locate said electron beam within any particular section by the vertical position of said radiated beam, means to locate said electron beam in a longitudinal position within any of said sections by the horizontal angle of said radiated beam, means to increase the intensity of said electron beam whenever a radiated pulse is received back by reflection from an object within said field, and means to locate said electron beam laterally of any given section at the instant of increased intensity, by means of the time required for a pulse to be radiated and to be received back by reflection from said object.

10. A system of radio echo detection comprising, in combination, means to produce a high-frequency electromagnetic radiation, means to modulate said radiation with a succession of spaced pulses, means to concentrate said radiation into a relatively narrow beam, means to cause said beam to scan a predetermined field about one axis, a cathode ray tube, means to cause the electron beam in said tube to sweep across the face of said tube in one direction as said radiated beam moves about said axis; the position of said electron beam in that direction corresponding to the angle of said radiated beam about said axis, means to cause said radiated beam to scan said field about another axis, means to cause said electron beam to move across the face of said tube in another direction, the position of said electron beam in said other direction representing a predetermined range of angular directions of said radiated beam about said other axis, additional means to cause said electron beam to move in a direction other than said first direction at a uniform rate commencing at the time each pulse is radiated, means to intercept radiation reflected back from an object within said field, and means to cause each pulse of said received radiation to increase the intensity of said electron beam.

11. A system of radio echo detection comprising, in combination, means to scan a predetermined field in space about two axes with a concentrated beam of electromagnetic radiation, means to intercept radiation reflected back from an object within said field, a screen, means to produce a visible indication on said screen in any one of a plurality of sections of said screen arranged in non-overlapping relationship, means to determine in which of said sections said visible indication will appear by the angle of said radiation beam about one of the axes of scanning, means to determine the position of said visual indication longitudinally of said section by the angle of said radiation beam about the other of said axes, and means to determine the transverse position of said visual indication in said section by the lapse of time required for said radiation to be reflected back from said object.

12. A system of radio echo detection comprising, in combination, means to produce a high-frequency electromagnetic radiation, means to modulate said radiation with a succession of spaced pulses, means to concentrate said radiation into a beam, means to cause said beam to continuously sweep a predetermined field about a first axis, means to cause said beam to scan said field about a second axis, said beam having angular widths in planes perpendicular to said first and second axes that are small fractions of the angular widths of said scanned field, means to intercept radiation reflected back from an object within said field, means to determine the lapse of time from the radiation of a pulse to its interception, as reflected from said object, means to determine the angle of said beam about said first axis when said reflected radiation is received, means to determine the angle of said beam about said second axis when said reflected radiation is received, and means to correlate the determination of said angles and said time lapse into a single graphic representation substantially instantaneously observable.

13. A system of radio echo detection comprising, in combination, means to radiate high-frequency electromagnetic waves in a substantially concentrated beam, means to modulate said radiation with a succession of spaced pulses, means to scan a predetermined field in two perpendicularly related directions with said beam, means to receive back radiation reflected from an object within said field, a cathode ray tube, means to cause the electron beam of said tube to scan the screen thereof in a plurality of separate long, narrow, juxtaposed sections, means to produce a visible indication on the face of said tube whenever a radiated pulse is received back by reflection from an object which intercepts said beam, means to select the scanned section in which said visual indication appears in accordance with the position of said radiated beam in one of said two directions, means to position said visual indication in a first direction within said selected section in accordance with the position of said radiated beam in the other of said two directions, and means to position said visual indication in a second direction within said selected section in accordance with the time required for a radiated pulse to be received back by reflection from said object.

14. A system for radio echo detection comprising, a transmitter for generating a succession of spaced pulses of high-frequency electromagnetic energy, a directive antenna mounted so as to be movable about two perpendicularly related axes, means coupling said transmitter to said antenna whereby said antenna is caused to radiate said spaced pulses and to receive target reflected echoes thereof, a receiver coupled to said antenna for amplifying said target reflected echoes, a cathode ray tube indicator having first and second beam deflection means and a beam-intensity control means, a time base generator for producing an output synchronized with the radiation of pulses from said antenna, the output of said time base generator being coupled to said first beam deflection means, means coupled to said antenna for producing a signal, the amplitude of said signal being continuously indicative of the position of said antenna about one of said axes, said last-mentioned means having the output thereof coupled to said second beam deflection means, means coupled to said antenna for producing a signal having an amplitude variable in steps, each step of said signal amplitude representing a predetermined range of angular positions of said antenna about the other of said axes, said last-mentioned means being coupled to said first beam deflection means for causing a deflection superimposed on the deflection caused by said time base generator, and means coupling the output of said receiver to said beam-intensity control of said cathode ray tube indicator.

15. A system for radio echo detection comprising, a transmitter for generating a succession of spaced pulses of high-frequency electromagnetic energy, a directive antenna mounted for continuous rotation about a first axis and mounted for oscillatory movement about a second axis perpendicular to said first axis, means coupling said transmitter to said antenna whereby said antenna is caused to radiate said spaced pulses and to receive target reflected echoes thereof, a receiver coupled to said antenna for amplifying said target reflected echoes, a cathode ray tube indicator having first and second beam deflection means and a beam-intensity control means, a linear time base generator for producing an output synchronized with the radiation of pulses from said antenna, the output of said linear time base generator being coupled to said first beam deflection means, a first potentiometer provided with continuously movable taps, said taps being coupled to said antenna so as to move therewith as said antenna rotates about said first axis, means for energizing said first potentiometer and means electrically coupling said taps of said first potentiometer to said second beam deflection means, a second potentiometer provided with a plurality of taps, means for energizing said second potentiometer, means mechanically coupled to said antenna for selectively coupling successive ones of said taps of said second potentiometer to said first beam deflection means as said antenna moves through successive angular ranges of movement about said second axis, said second potentiometer causing a deflection which is superimposed on the deflection caused by said time base generator, and means coupling the output of said receiver to said beam-intensity control of said cathode ray tube indicator.

WILLIAM M. HALL.

REFERENCES CITED

The following references are of record in the file of this patent:

UNITED STATES PATENTS

| Number | Name | Date |
|---|---|---|
| 2,405,231 | Newhouse | Aug. 16, 1946 |
| 2,409,448 | Rost | Oct. 15, 1946 |
| 2,412,703 | Wolff | Dec. 17, 1946 |
| 2,423,104 | Labin | July 1, 1947 |
| 2,426,189 | Espenchied | Aug. 26, 1947 |
| 2,426,218 | Hopgood | Aug. 26, 1947 |
| 2,449,976 | Busignies | Sept. 28, 1948 |